United States Patent
Fujita et al.

(10) Patent No.: US 7,313,327 B2
(45) Date of Patent: Dec. 25, 2007

(54) SWITCHING CONTROL DEVICE FOR WAVELENGTH-DIVISION MULTIPLEXING OPTICAL SIGNAL

(75) Inventors: Takehiro Fujita, Kawasaki (JP); Futoshi Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/004,222

(22) Filed: Dec. 2, 2004

(65) Prior Publication Data

US 2005/0135807 A1    Jun. 23, 2005

Related U.S. Application Data

(63) Continuation of application No. PCT/JP02/05611, filed on Jun. 6, 2002.

(51) Int. Cl.
*H04J 14/00* (2006.01)
(52) U.S. Cl. ...................................................... 398/48
(58) Field of Classification Search ............ 398/45–57, 398/111, 1–9, 29; 370/392
See application file for complete search history.

(56) References Cited

U.S. PATENT DOCUMENTS

| | | | |
|---|---|---|---|
| 6,327,253 B1 * | 12/2001 | Frink | 370/260 |
| 6,424,445 B1 * | 7/2002 | Tsushima et al. | 398/177 |
| 6,594,050 B2 * | 7/2003 | Jannson et al. | 398/52 |
| 6,947,421 B1 * | 9/2005 | Glingener et al. | 370/392 |
| 7,054,555 B2 * | 5/2006 | Maeno | 398/31 |
| 2002/0009098 A1 * | 1/2002 | Staiger | 370/445 |

FOREIGN PATENT DOCUMENTS

| | | |
|---|---|---|
| JP | 54-5309 | 1/1979 |
| JP | 63-155857 | 6/1988 |
| JP | 11-243564 | 9/1999 |
| JP | 2000-134154 | 5/2000 |
| JP | 2000-341728 | 12/2000 |

OTHER PUBLICATIONS

Notice of Rejection Grounds dated Apr. 25, 2006.

* cited by examiner

*Primary Examiner*—Shi K Li
(74) *Attorney, Agent, or Firm*—Katten Muchin Rosenman LLP

(57) ABSTRACT

In a WDM optical communication network composed of a transmitter, an optical switching device (an optical cross-connect, an optical router, etc.) and a receiver, when transmitting switching information to the optical switching device, the transmitter suspends the transmission of a main signal by a wavelength for switching of a WDM optical signal and transmits switching information instead. Upon receipt of this switching information, the optical switching device switches a route, re-starts the transmission of a main signal after the switching is completed and transfers the main signal through the switched route. The signal speed of switching information is sufficiently lower than the modulation speed of the main signals with other wavelengths. By designing the receiving device so that the receiving device of switching information reacts only to this low modulation speed, the receiving device can extract only switching information even when receiving the entire WDM optical signal including the main signals with other wavelengths.

33 Claims, 18 Drawing Sheets

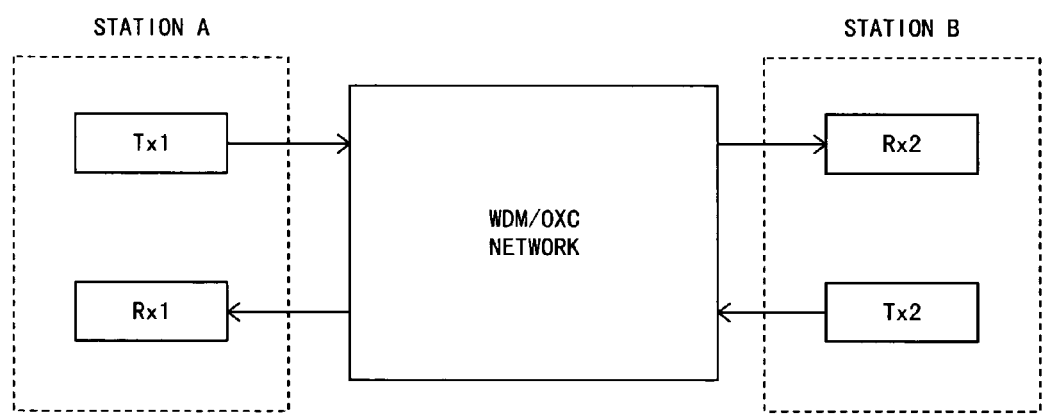
F I G. 5

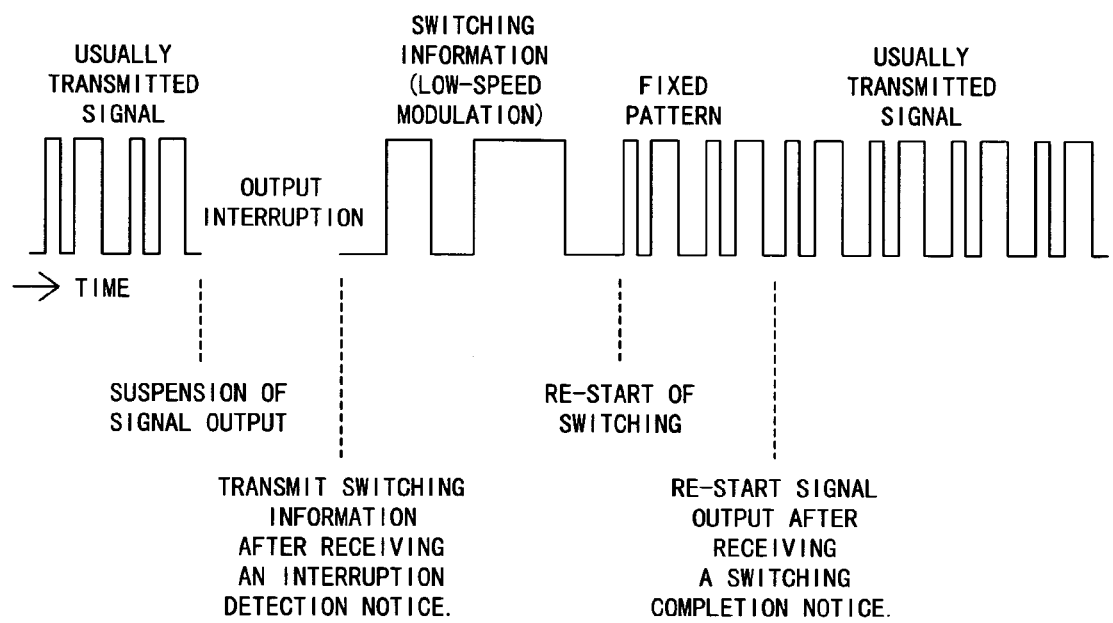
F I G. 6

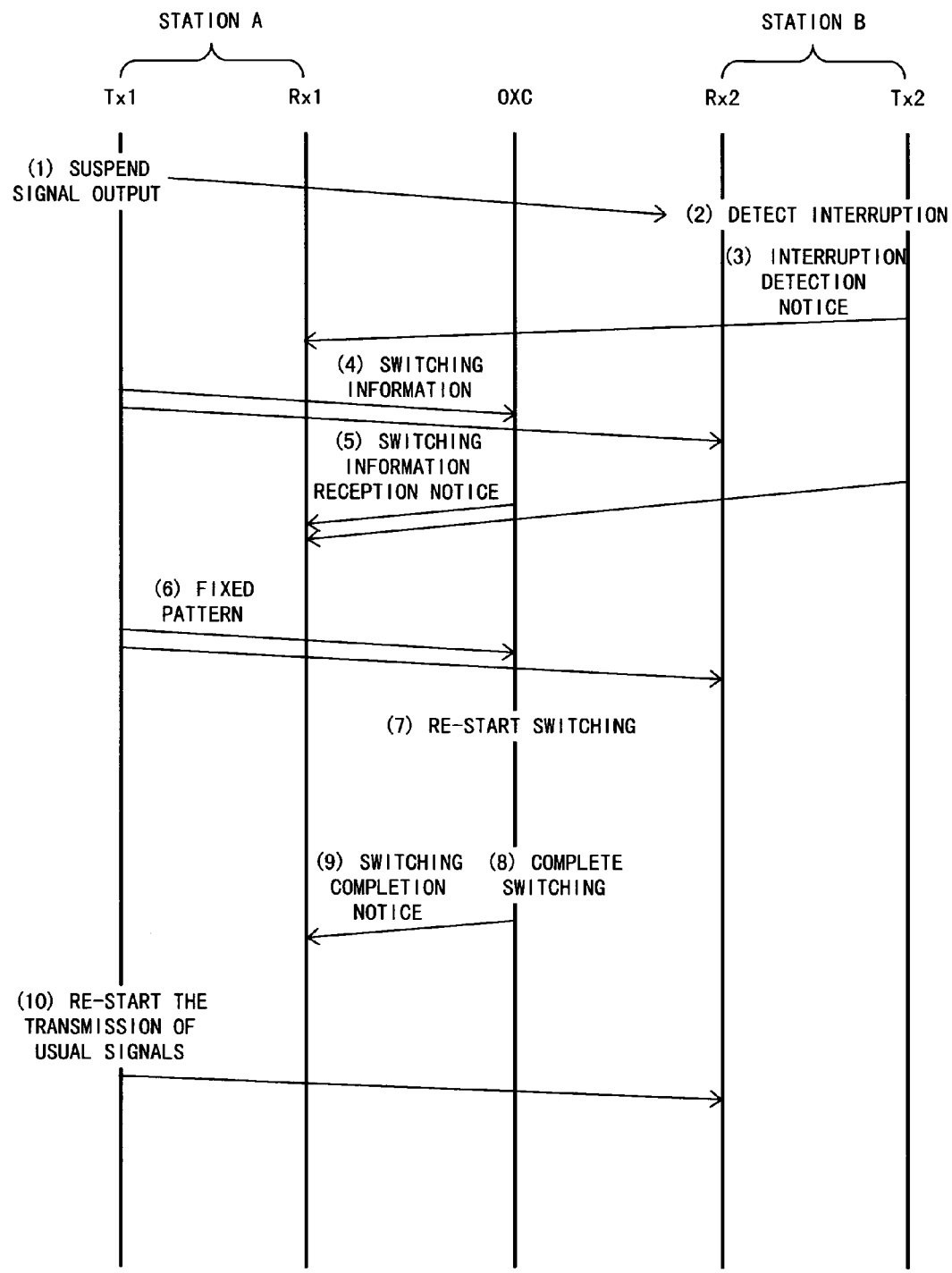
F I G. 7

(a)

(b)

(a)

(b)

| FIXED PATTERN | WAVELENGTH CHANNEL INFORMATION | SWITCH REQUEST | REPLY INFORMATION | TRANSMITTING DESTINATION ADDRESS | TRANSMITTING SOURCE ADDRESS | CONNECTION PATH DESTINATION STATE | ERROR DETECTION /CORRECTION |
|---|---|---|---|---|---|---|---|

F I G. 17

SWITCHING CONTROL DEVICE FOR WAVELENGTH-DIVISION MULTIPLEXING OPTICAL SIGNAL

CROSS-REFERENCE TO RELATED APPLICATION

This application is a continuation of an International Application No. PCT/JP02/05611, which was filed on Jun. 6, 2002, which is herein incorporated by reference.

BACKGROUND OF THE INVENTION

1. Field of the Invention

The present invention relates to a wavelength-division multiplexing (WDM) communication system.

2. Description of the Related Art

Due to the rapid progress of optical wavelength multiplexing technology and its introduction to the market, rapid market expansion of backbone networks has been promoted in recent years. The number of wavelength-division multiplexed waves of a WDM system has exceeded 160 and the number of devices connected to the WDM system, such as synchronous optical networks (SONET), synchronous digital hierarchy (SDH) devices and the like has greatly increased. As a result, installation space and cost have exponentially increased as the number of wavelengths to be multiplexed increases, and the burden on communication carriers has increased. In such a situation, optical networks for converting enormous optical signals multiplexed by a WDM function into electrical signals in each node and distributing them to each path cannot meet the market demand any more with respect to the processing speed and cost of the devices. Therefore, demand for optical routers, optical cross-connect devices and the like, capable of processing wavelength-divisionally multiplexed (WDM) optical signals without any additional processing, for example, routing them as light, has been increasing, and the development of technologies related to it has been urgently required.

FIG. 1 shows the basic configuration of a conventional optical cross-connect.

Since an optical cross-connect switches routes light as it is, there is no need to terminate electrical signals. When a WDM optical signal which is wavelength multiplexed one is inputted to an optical cross-connect, a wavelength demultiplexer 10 demultiplexes the optical signal into a plurality of optical signals each with one of wavelengths $\lambda 1$ through $\lambda n$. The demultiplexed optical signals are inputted to an optical switch structure after being demultiplexed. Then, after being switched, the optical signal is outputted for each wavelength again and is inputted to a wavelength multiplexer 11. The wavelength multiplexer 11 applies wavelength-division multiplexing (WDM) to the optical signals with each wavelength, and generates/outputs a WDM optical signal.

FIG. 2 shows a conventional WDM system.

As shown in FIG. 2, in the prior art, an optical supervisory channel (OSC) control signal is provided separately from a WDM optical signal, and the OSC control signal stores information for switching light with each wavelength. When receiving this OSC signal, each optical cross-connect station determines the switching direction of optical switching, based on the contents of the OSC signal and performs the optical switching. However, since in such a method, optical switching information must be put on the OSC control signal, the trace information of SONET/SDH device or the like for outputting each wavelength must be transferred to an OSC signal transmitting unit provided for a WDM device. Therefore, such information must be transmitted/received between all SONET/SDH devices 15 or transponder devices 16 (a device for converting received light into light with a predetermined wavelength in order to apply WDM to it to transmit it), connected to the WDM device.

In the above-mentioned prior art, such signal information of SONET/SDH device or the like to be put on each wavelength channel must be taken in by converting it from optical to electrical in the WDM device once or a circuit line which communicate the information should be provided by the other means.

Specifically, in the transponder device 16, such as the SONET/SDH device 15 or the like, control information stored in the header of data formed in a frame is once demultiplexed for each frame without any conversion by the photo-coupler 18 of the WDM station (WDM device) 17, is terminated at a data communication channel (DCC) termination/OSC transmission unit 19 and is converted into an electrical signal. Then, necessary control information is extracted from the electrical signal and is converted into an optical signal with an OSC channel wavelength. This OSC channel optical signal is multiplexed onto a main signal transmitted from a WDM device 20 in the latter stage of the WDM device 20 for multiplexing optical signals from the SONET/SDH device 15 or the like, by a coupler 21.

The WDM optical signal generated thus is transmitted through a transmission line and is inputted to an optical cross-connect station 25. Upon receipt of the WDM optical signal, the optical cross-connect station 25 demultiplexes an OSC channel from the received WDM optical signal in an OSC separation unit 22, and converts the OSC optical signal into an electrical signal in an OSC termination/transmission unit 23. Then, the OSC termination/transmission unit 23 extracts control information from the electrical signal and issues a switching instruction to an optical switch structure 12. Then, this control information is converted into an optical signal again and is inputted to an OSC insertion unit 24 as an OSC optical signal.

The WDM optical signal from which the OSC signal is separated is demultiplexed into signals with each wavelength by a wavelength demultiplexer 10, and is switched by the optical switch structure 12. Then, after WDM is applied to the demultiplexed signals in a wavelength multiplexing unit 11, the OSC signal is inserted in the multiplexed signal by the OSC insertion unit 24 and is transmitted from the optical cross-connect station 25.

FIG. 3 explains the conventional problems.

Conventionally, a system in which switching information and the like is converted from optical to electrical and is collected as the number of wavelengths increases, as shown in FIG. 3, increases cost. Specifically, in a WDM station 17, an optical signal with each wavelength is transmitted to a DCC termination unit 19-1 after being once converted into an electrical signal, and an OSC signal is generated in an OSC transmission unit 19-2. Therefore, the number of optical/electrical converters 30 becomes enormous. Namely, in a WDM system, the number of multiplexed wavelengths is considered to exceed 100 in the future. However, in the configuration shown in FIG. 3, since an optical/electrical converter 30 must be provided for all wavelengths exceeding 100, 100 or more optical/electrical converters 30 become necessary and hardware increases.

If a communication device, such as a SONET/SDH device or the like provided for each channel is installed in the same station as the WDM device as a separate communication means, there is no need for optical/electrical conversion, since electrical signals can be used. Therefore, a simple and inexpensive communication method for transmitting/receiving such information can be realized. However, if a communication device, such as a SONET/SDH device or the like is not installed in the same station as the WDM device, communication must be conducted by light as long as connection is made only by an optical fiber. In that case, cost increases.

SUMMARY OF THE INVENTION

It is an object of the present invention to provide a technology capable of switching light on the remote SONET/SDH device side or the like provided for each channel without the increase of cost.

The switching control method of the present invention performs the switching control of an optical-connect device, and comprises a control information transmitting step of suspending the transmission of a main signal and transmitting control information for instructing the switching control of the optical cross-connect device utilizing the wavelength of the main signal, a completion notice step of transmitting a signal for indicating the completion of switching information, utilizing the main signal wavelength after transmitting the control information and a re-start step of re-starting the transmission of a main signal suspended, when receiving a switching completion notice.

The control device of the present invention performs the switching control of an optical cross-connect, and comprises a control information transmitting unit for suspending the transmission of a main signal and transmitting control information for instructing the switching control of the optical cross-connect device utilizing the wavelength of a main signal, a completion notification unit for transmitting a signal for indicating the completion of switching, utilizing a main signal wavelength after transmitting the control information and a re-start unit for re-starting the transmission of a main signal suspended, when receiving a switching completion notice.

The optical cross-connect device of the present invention comprises an optical switch for switching an optical communication line, a control information receiving unit for receiving switching information transmitted utilizing the wavelength of a main signal, a switching control unit for instructing the optical switch to switch the optical communication line, according to the control information after receiving a switching information end signal and a completion notification unit for notifying the transmitting source of switching information for the completion of the switching.

According to the present invention, the configuration to extract switching information from converted electrical signal from optical signals for each wavelength, put it in the optical supervisory control channel and send it in order to put the switching information in the wavelength signal of the optical supervisory control channel, is not needed.

As to the reception of switching information, since there is no need to demultiplex an optical monitoring control channel signal, a plurality of WDM signals can be collectively received and only switching information can be extracted from each WDM signal.

BRIEF DESCRIPTION OF THE DRAWINGS

FIG. 5 shows a system configuration presuming the switching flow;

FIG. 6 shows the output signal pattern of a transmitter (Tx1);

FIG. 7 shows switching sequence according to the preferred embodiment of the present invention;

FIG. 17 shows one structure of a switching information frame; and

DESCRIPTION OF THE PREFERRED EMBODIMENTS

Figure 1:
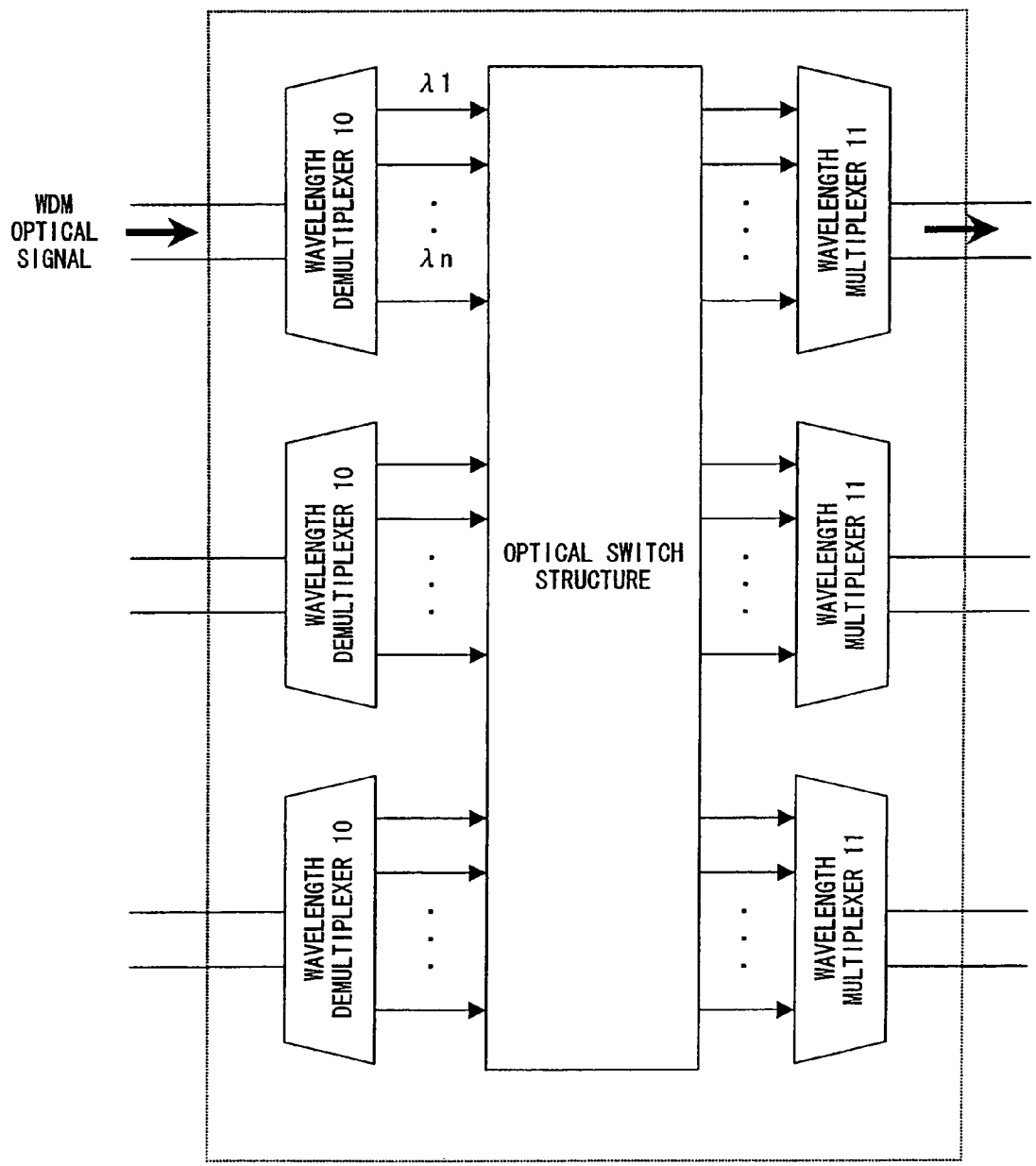
FIG. 1 shows the basic configuration of the conventional optical cross-connect.
Figure 2:
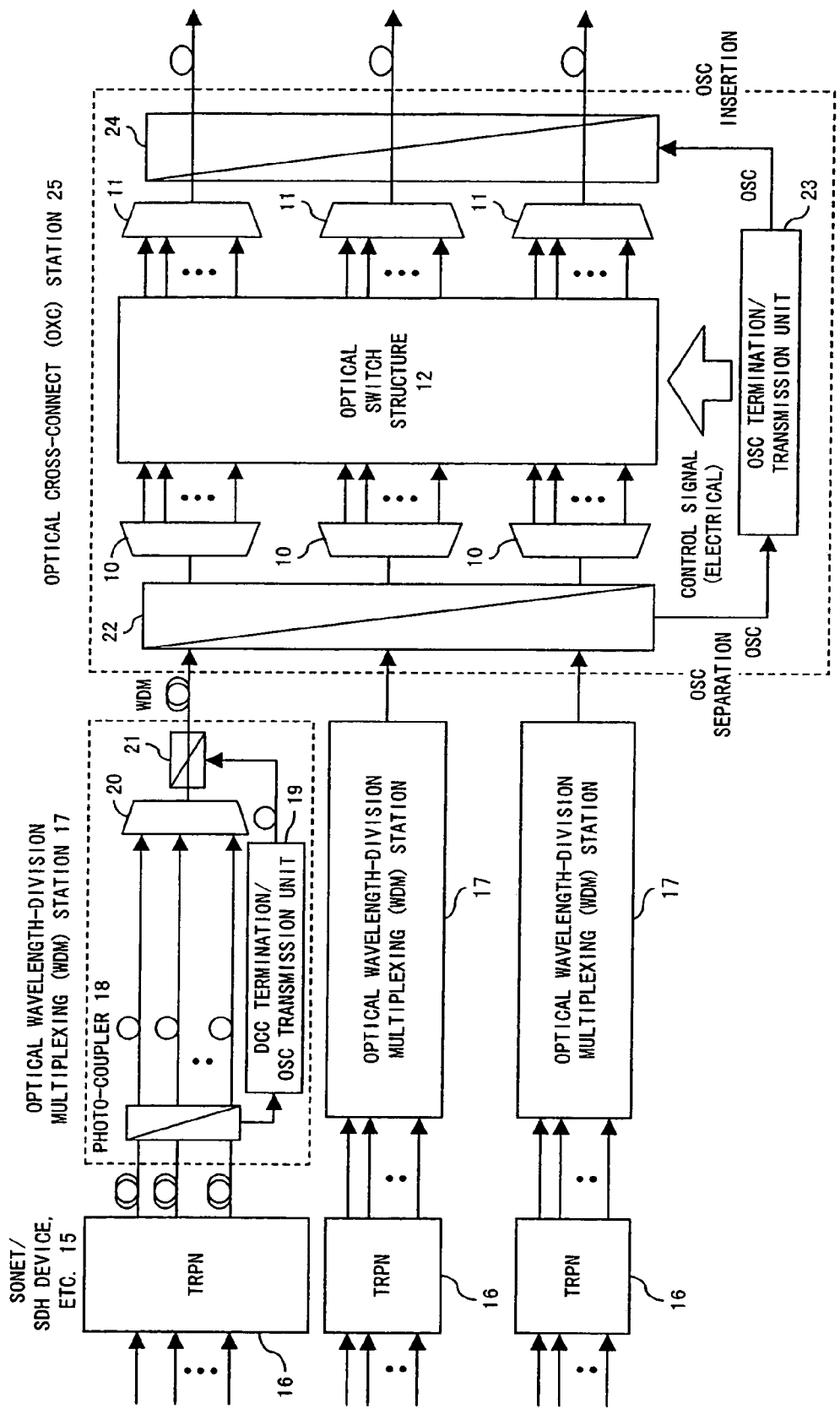
FIG. 2 explains the conventional WDM system.
Figure 3:
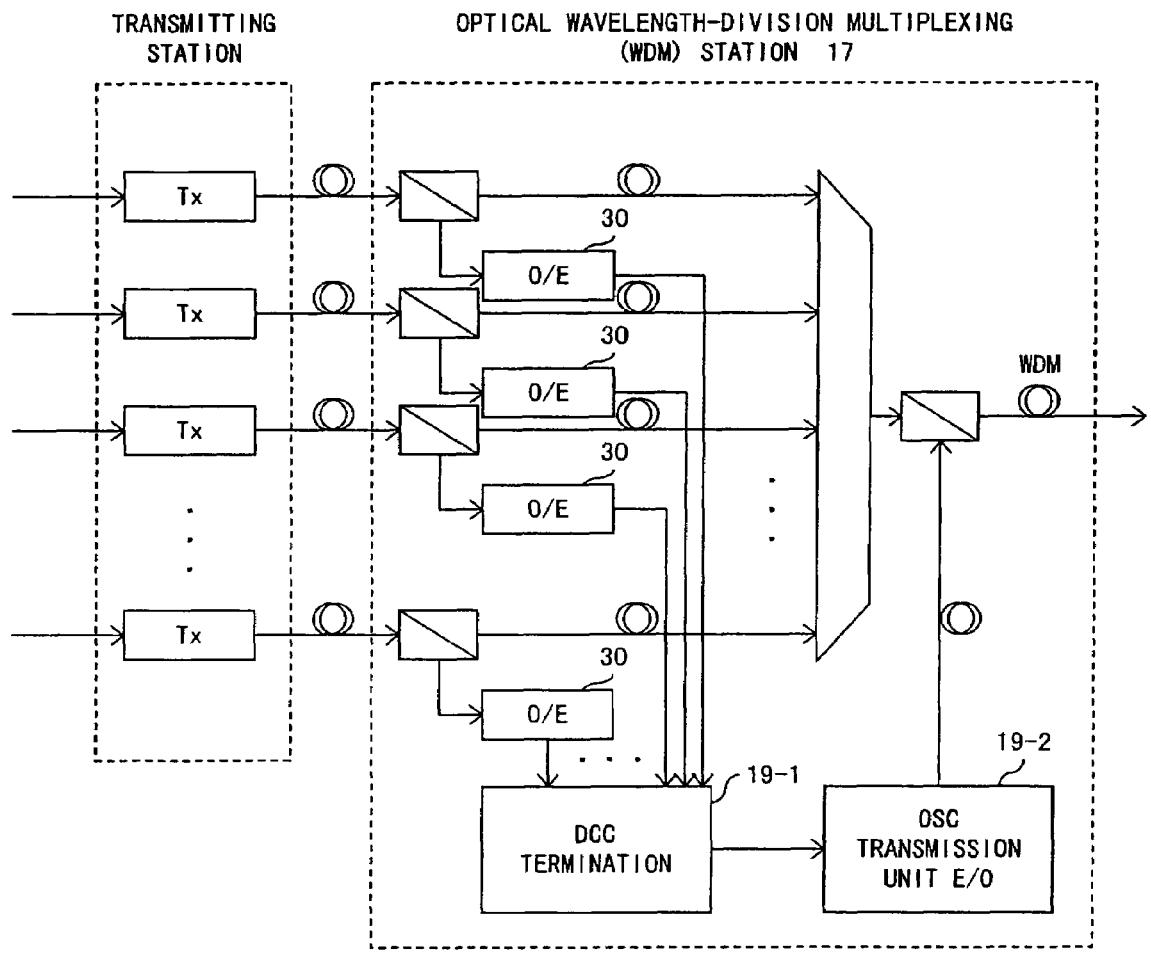
FIG. 3 explains the conventional problems.
Figure 4:
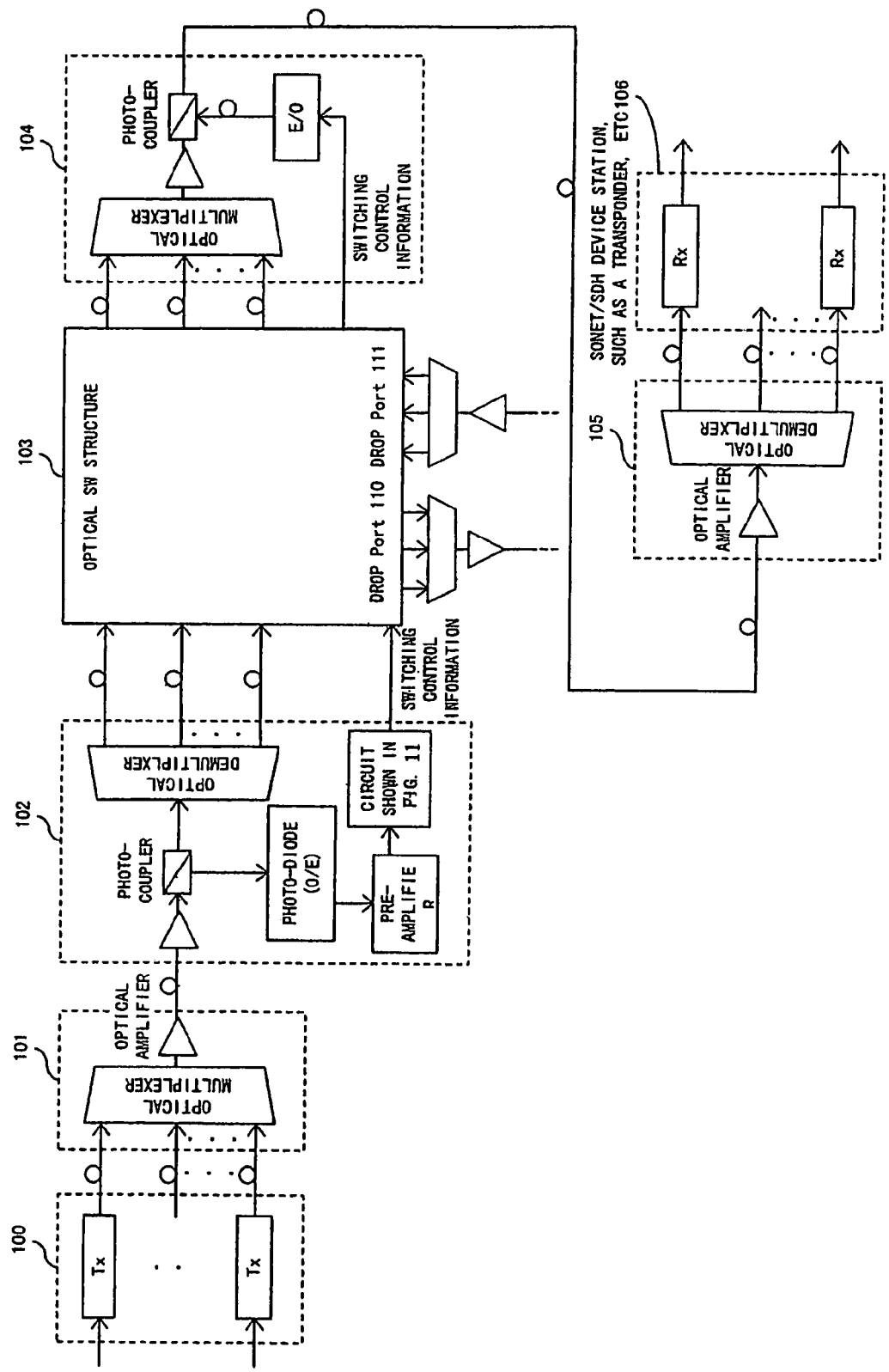
FIG. 4 shows the comprehensive configuration of a system according to the preferred embodiment of the present invention.

FIG. 4 shows the entire configuration of a system according to the preferred embodiment of the present invention.

Firstly, on the transmitting side, a SONET/SDH device 100 accommodating a plurality of transmitters Tx including a transponder and the like is provided to transmit optical signals with each wavelength. The optical signals with each wavelength are multiplexed by an optical multiplexing device 101. The optical multiplexing device 101 comprises an optical multiplexer and an optical amplifier. Each optical signal transmitted from the optical multiplexing device 101 is transmitted through a transmission line as a WDM optical signal and is inputted to the wavelength multiplexing device 102 of the optical cross-connect device. In the preferred embodiment of the present invention, a photo-coupler is provided before the optical demultiplexer of the wavelength demultiplexing device 102, and routing information and the like is extracted from the WDM optical signal. The extracted optical signal including routing information and the like is converted into an electrical signal by a photo-diode, which is an optical/electrical conversion device, and is amplified by a pre-amplifier. Then, the electrical signal is processed by a circuit shown in FIG. 6, and switching information is transferred to an optical switch (SW) structure 103. The optical SW structure 103 switches an optical route, according to the switching information. Thus, a specific optical signal is outputted from a drop port 110, and another optical signal is inputted from an add port 111. After switching these optical signals, the optical SW structure 103 outputs optical signals to the optical multiplexer of the optical multiplexing device 104. The optical SW structure 103 also outputs switching information. The optical multiplexer applies WDM to optical signals to generate a WDM optical signal. The WDM optical signal is amplified by an optical amplifier. Then, switching information converted from an electrical signal to an optical signal by a photo-coupler is multiplexed and is transmitted to a transmission line.

On the receiving side, the optical multiplexing device 105 amplifies a received optical signal by an optical amplifier, demultiplexes the amplified optical signal into optical signals with each wavelength by an optical demultiplexer and transfers the signals to the receiving device Rx of the SONET/SDH device station 106.

The basic concept of this preferred embodiment is described below.

The switching time of a currently known practical optical switch is expressed in units of milli-seconds. This means that information that is modulated in units of Gbps and is accommodated in each wavelength channel cannot be switched without instantaneous interruption. If the system includes an optical amplifier, an instantaneous interruption time accompanying the switching of an optical switch becomes longer and amounts to 30 through 100 ms. After all, in order to switch an optical switch without instantaneous interruption, a technology for switching at an electrical level without instantaneous interruption must be applied. For such a reason, when an optical switch is switched by transmitting optical switching information to an optical switching station disposed in a WDM network system, the instantaneous interruption of the wavelength channel always occurs.

When switching an optical switch, there is a possibility that an optical surge which instantaneously generates a large optical power may occur and accordingly, there is also a possibility that the switching of an optical switch may damage a receiver since light is rapidly inputted to the receiver. If an optical amplifier is disposed before a light receiving unit on the way to a receiver after an optical signal is demultiplexed into each wavelength signal, such a risk increases.

Therefore, when switching an optical switch according to switching information, on the transmitting side, the output of the wavelength signal must be reduced to a proper level while the switching is being performed. Even when there is no possibility that an optical surge may occur, the instantaneous interruption of light cannot be avoided at the time of switching. Therefore, even when the transmitting side transmits an optical signal at the time of switching, the receiving side cannot receive information. In other words, if the transmitting side suspends the transmission of optical signals when performing switching, there are no problems. Therefore, the transmitter of a channel to be switched or the transmitter of an optical signal with a specific wavelength of a WDM optical signal can also be used to transmit information for light switching besides communication information to be essentially transmitted.

In this case, a signal composing switching information must be composed of a bit rate far lower than that of a main signal, such as approximately 1.5 Mbps. Then, since the WDM main signal is modulated at high speed and hardly includes low-speed signal components, switching information can be accurately extracted as long as the characteristic of a switching information receiving unit provided for an optical cross-connect station or a receiving side device is optimized for this low-speed bit rate.

Since a more inexpensive transmitter/receiver can be realized by composing switching information by a low-speed bit rate, the function can be provided at low cost, which is an advantage.

Next, the switching flow is described with reference to the system configuration shown in FIG. 5.

The configuration shown in FIG. 5 conceptually shows that stations A and B are connected by a WDM/OXC (optical cross-connect) network. Station A is provided with a transmitter Tx1 and a receiver Rx1. Station B is provided with a transmitter Tx2 and a receiver Rx2. Optical signals are transmitted/received between the transmitter Tx1 and the receiver Rx2 or between the transmitter Tx2 and the receiver Rx1.

FIG. 6 shows the output signal pattern of a transmitter (Tx1). FIG. 7 shows switching sequence according to the preferred embodiment of the present invention.

In FIG. 6, if a switching process is required when transmitting usually transmitted signals, a transmitter suspends the transmission of usually transmitted signals on a wavelength for switching and intentionally causes output interruption. Then, the transmitter transmits switching information, which is a low-speed modulation signal, using the wavelength, that is, the channel. Then, after the transmission of switching information is completed, the transmitter transmits a fixed pattern signal with a prescribed pattern and starts switching. Then, after receiving a switching completion notice, the transmitter re-starts transmitting usually transmitted signals.

Description is made according to the sequence shown in FIG. 7.

1. The transmitting side transmitter (Tx1) suspends the output immediately before switching the route of an OXC (optical cross-connect).
2. When the receiver (Rx2) of station B detects a signal interruption (2), station B transmitter (Tx2) issues an interruption detection notice to station A receiver (Rx1) (3).
3. Station A transmitter (TX1) transmits switching information to both the OXC and station B (4).
4. Upon receipt of the switching information, each of the OXC and station B issues a switching information reception notice to station A (5).
5. Then, station A transmits a fixed pattern to the OXC and station B (6).
6. Upon receipt of the fixed pattern, the OXC starts switching (7).
7. After completing the switching (8), the OXC issues a switching completion notice to station A (9).
8. Upon receipt of the switching completion notice, station A starts transmitting usual signals to station B (10).

Figure 8:
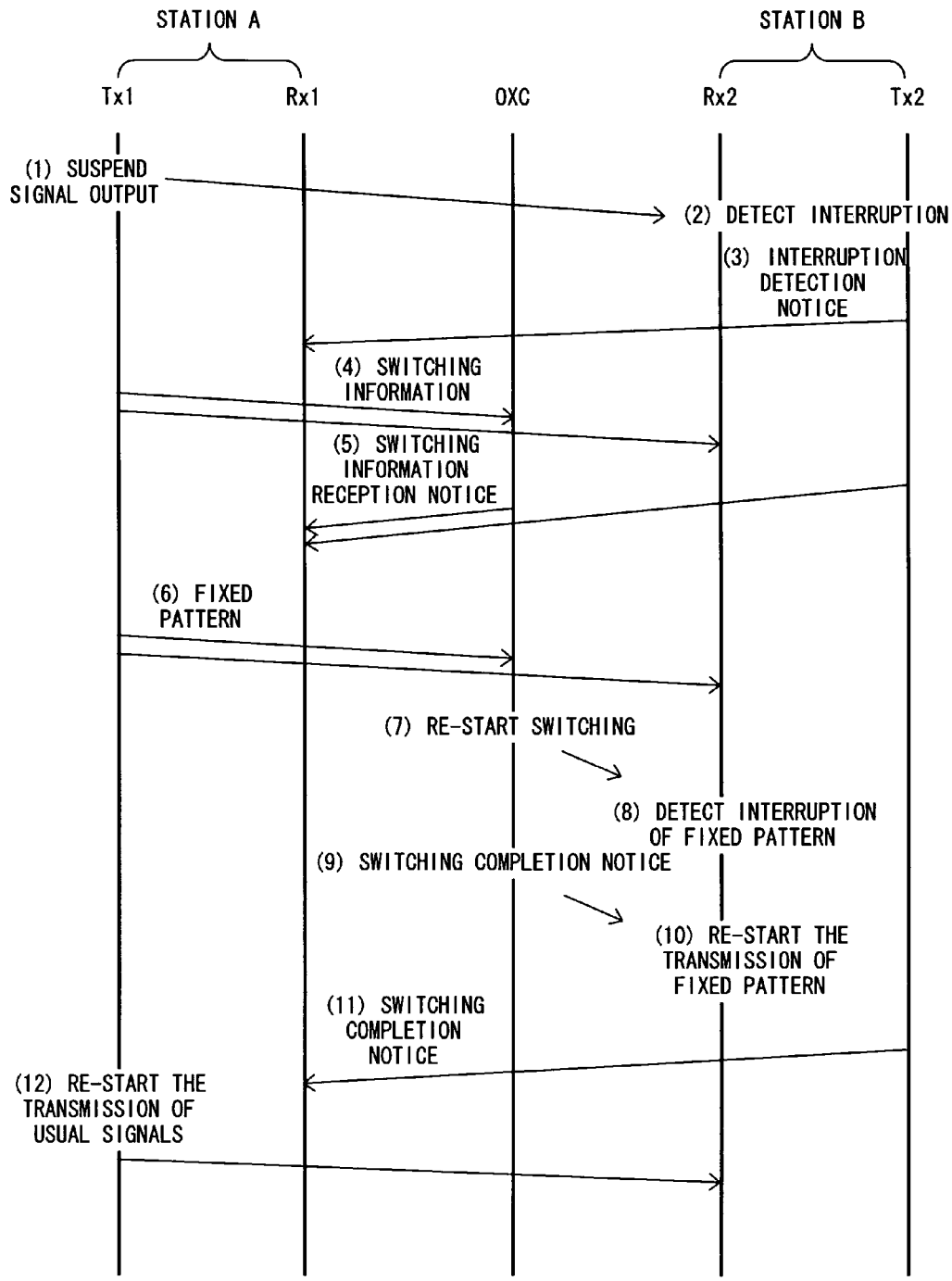
FIG. 8 shows another example of the switching sequence according to the preferred embodiment of the present invention.

FIG. 8 shows another example of the switching sequence according to the preferred embodiment of the present invention.

Description is made according to the sequence shown in FIG. 8.

1. The transmitting side transmitter (Tx1) suspends the output immediately before switching the route of an OXC (1).
2. When the receiver (Rx2) of station B detects a signal interruption (2), station B transmitter (Tx2) issues an interruption detection notice to station A receiver (Rx1) (3).
3. After the receiver RX1 receives the interruption detection notice, the transmitter TX 1 transmits switching information to the OXC and the receiver Rx2 (4).

4. Upon receipt of the switching information, each of station B and the OXC notifies station A of the reception of the switching information (5).
5. The transmitter Tx1 transmits a fixed pattern (6), and the OXC starts switching according to the switching information (7).
6. Accompanying the OSC switching, the interruption of the fixed pattern is detected in station B (8).
7. After the OXC switching is completed (9), a fixed pattern is received again in station B (10).
8. By station B receiving a fixed pattern again, it is recognized that the OXC switching is completed, and the transmitter Tx2 issues a switching completion notice to the receiver Rx1 (11).
9. The transmitter Tx1 starts the transmission of usual signals (12).

As shown in FIG. 8, making the condition for OXC switching completion an occurrence of an event that once the interruption of the fixed pattern is detected at the B station and then it restores, is effective to securely conduct the switching.

Figure 9:
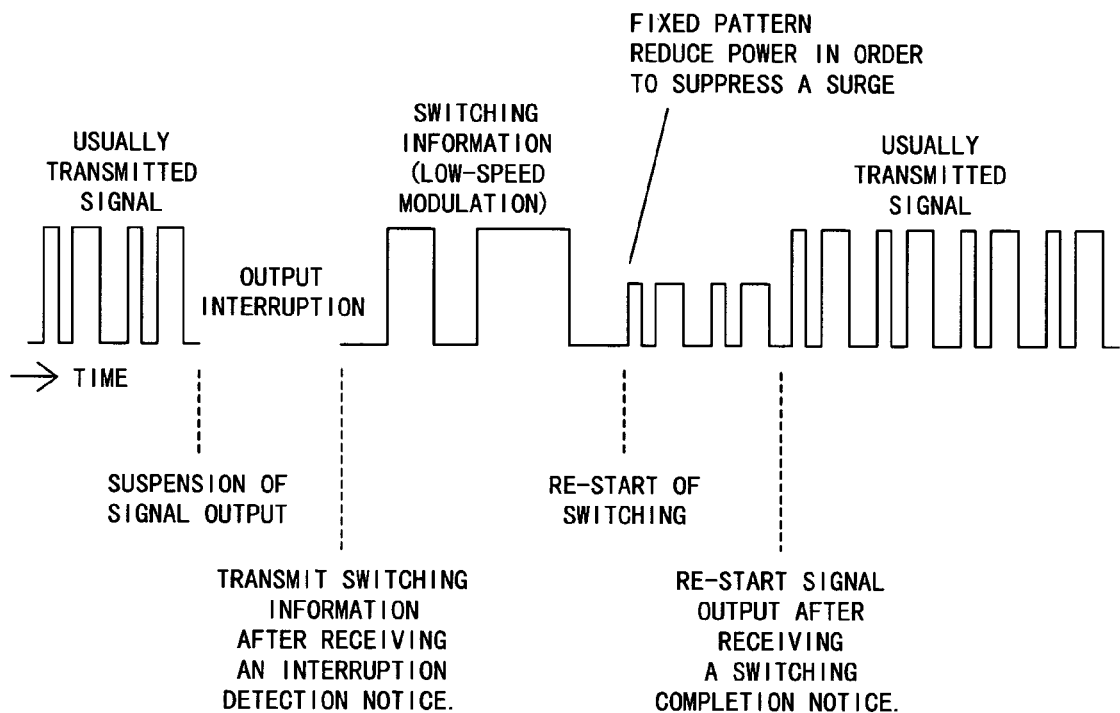
FIG. 9 shows another output signal pattern of the transmitter.

FIG. 9 shows another fixed signal pattern outputted by the transmitter.

Although the fixed pattern of FIG. 9 is almost the same as that of FIG. 6, in FIG. 9, its output is reduced lower than that of a usual signal. Switching is performed while transmitting a fixed pattern. However, when performing switching, a fixed pattern suddenly appears in a new route. As described above, this causes a surge to lead to a possibility of damaging an optical amplifier or the like. Therefore, the output of a fixed pattern is reduced to a level such that such a surge may not damage an optical amplifier or the like.

As described above, by reducing the transmitting power of a specific pattern lower than usually transmitted, the damage of a receiver by a surge caused when completing switching can be avoided even in a system provided with an optical amplifier immediately before a receiver, which is an advantage.

As described above, according to the preferred embodiment of the present invention, as shown in FIG. 4, switching information to an optical cross-connect device can be received by only one monitor for each WDM line provided for an optical switching station. Alternatively, if wavelength channels are grouped for each plurality of wavelength bands, a receiver for receiving each segment of switching information for each wavelength group can be provided. Since such a method does not require a means for demultiplexing an optical signal in a WDM state into each channel, device configuration can be simplified. Therefore, device size can be reduced and also cost can be suppressed, which is an advantage. Specifically, low-speed switching information is put on a wavelength for switching and high-speed information is put on other wavelengths. Therefore, as long as a circuit for extracting switching information is designed so as to react to only low-speed signals, high-speed information signals with other wavelengths can be neglected since the high-speed information signals look for the circuit as if they were DC components. Thus, the circuit can detect only low-speed switching information. Since this fact applies to a signal with any wavelength, by detecting a WDM optical signal by a low-speed circuit, switching information can be extracted without demultiplexing a signal with a specific wavelength.

Figure 10:
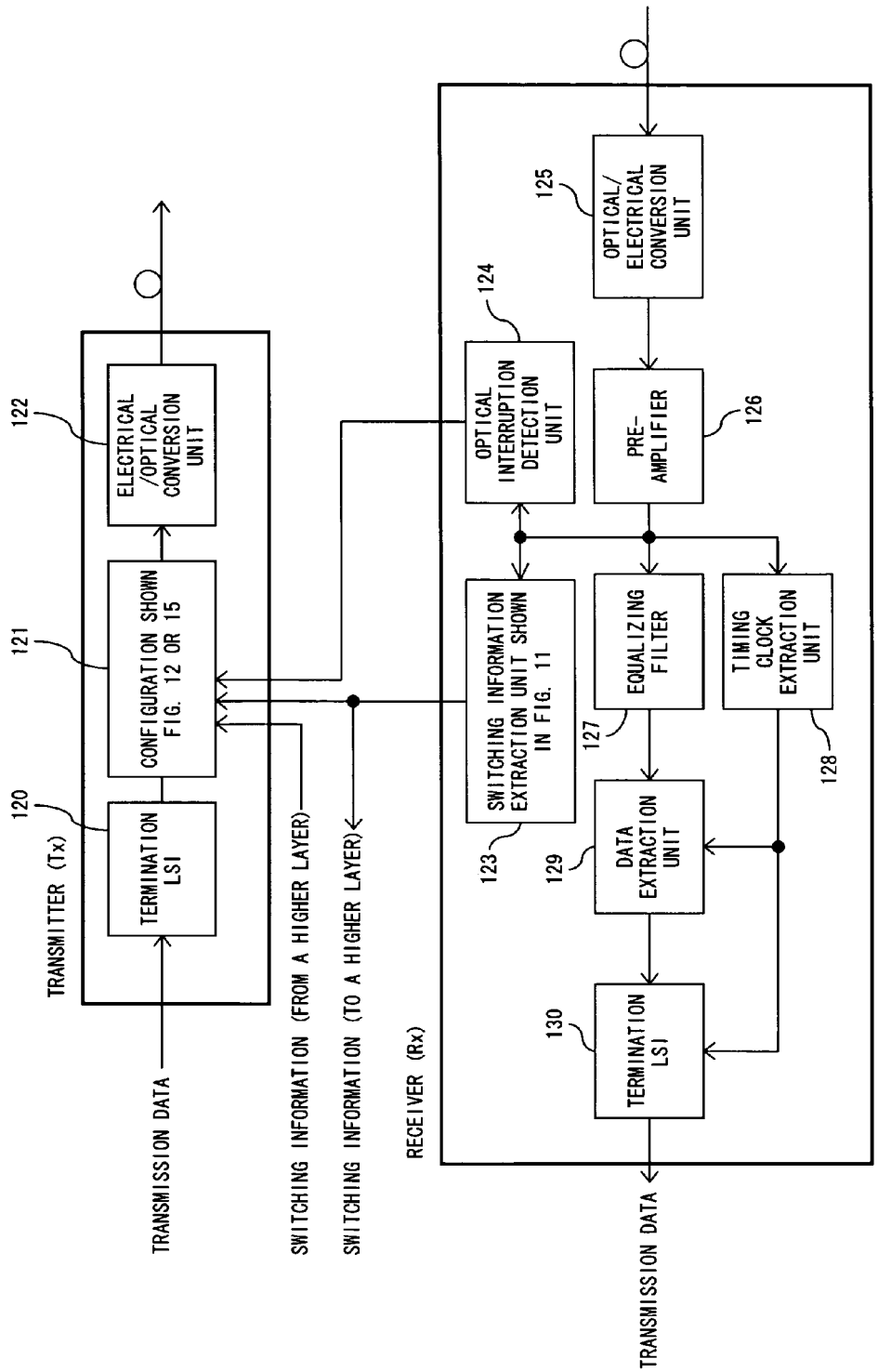
FIG. 10 shows the respective configurations of a transmitter and receiver according to the preferred embodiment of the present invention.

FIG. 10 shows the respective configurations of a transmitter and receiver according to the preferred embodiment of the present invention.

The transmitter comprises a termination LSI 120 for receiving/terminating transmission data and converting the data into electrical signals, a circuit 121 which is described later with reference to FIG. 12 or 15, and an electrical/optical conversion unit 122.

When an optical signal arrives, the receiver receives the optical signal by an optical/electrical conversion unit 125 and converts the optical signal into an electrical signal. A pre-amplifier 126 amplifies electrical signals obtained by converting received optical signals to be powered so as to be suitable for a later process. The output of the pre-amplifier 126 is supplied to a switching information extraction unit 123, an optical interruption detection unit 124, an equalizing filter 127 and a timing clock extraction unit 128. The timing clock extraction unit 128 generates timing signals for extracting data from received signals. The equalizing filter 127 re-shapes signal waveforms to waveforms suitable for data extraction by eliminating the RF components of received signals or the like. The output of the equalizing filter 127 is inputted to a data extraction unit 129, and extracts data, according to a timing clock from the timing clock extraction unit 128. The extracted data is outputted through the termination LSI 130 as transmission data.

If the optical interruption detection unit 124 detects the interruption of an optical signal, the information is transmitted to the block 121 of the transmitter. The switching information extraction unit 123 has a configuration shown in FIG. 11. The details are not presented here, but the operation is as follows. The switching information extraction unit 123 extracts switching information and inputs the switching information to the block 121 of the transmitter. Simultaneously, the switching information extraction unit 123 notifies a higher layer of the switching information.

Figure 11:
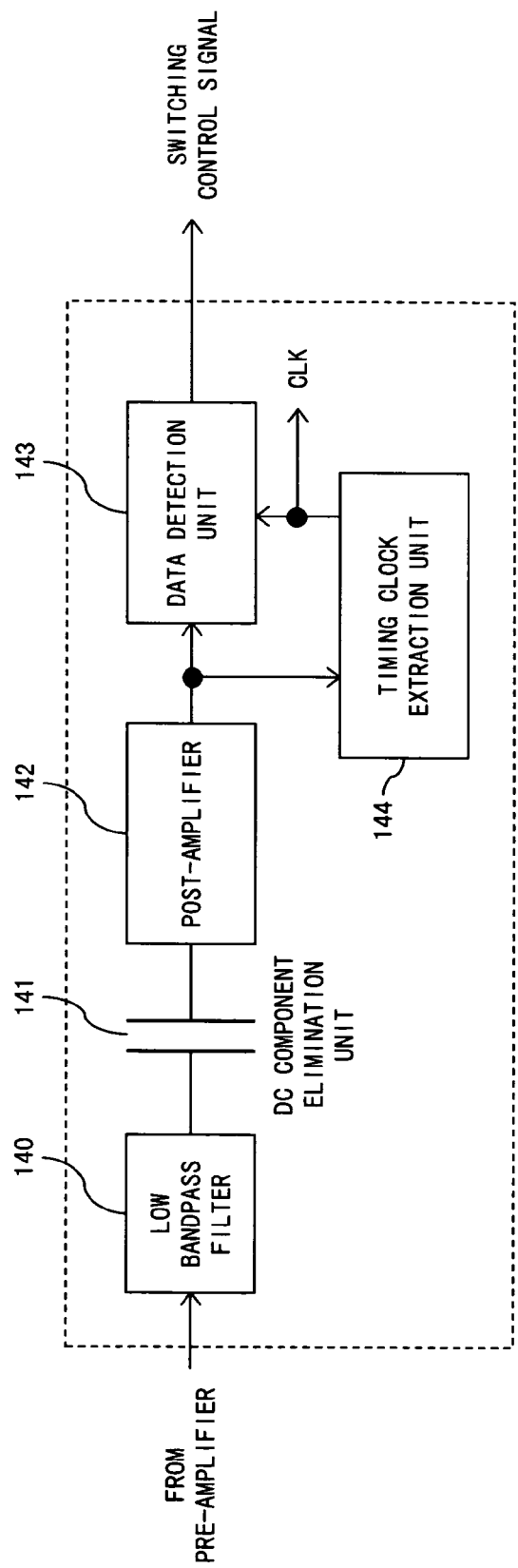
FIG. 11 shows one configuration of the switching information extraction circuit shown in FIG. 10.

FIG. 11 shows one configuration of the switching information extraction circuit shown in FIG. 10.

The circuit shown in FIG. 11 receives a signal from the pre-amplifier 126 shown in FIG. 10. This signal is transmitted through a low-band pass filter 140. Thus, high-speed information signals other than a low-speed switching information signal are eliminated. Furthermore, a DC component elimination unit eliminates DC components. Then, the switching information is amplified by a post-amplifier 142, and is supplied to a data detection unit 143 and a timing clock extraction unit 144. The timing clock extraction unit 144 extracts a timing clock needed to detect data and supplies the timing clock to the data detection unit 143. Simultaneously, the timing clock extraction unit 144 is used as a clock signal. The data detection unit 143 detects data from the signal from the post-amplifier 142, based on the timing clock from the timing clock extraction unit 144, and outputs the result as switching information.

Although as described above, switching information is composed of a low bit rate, it is generally known that if data, "0" or "1", is consecutively inputted to a receiver, transmission quality degrades.

Figure 12:
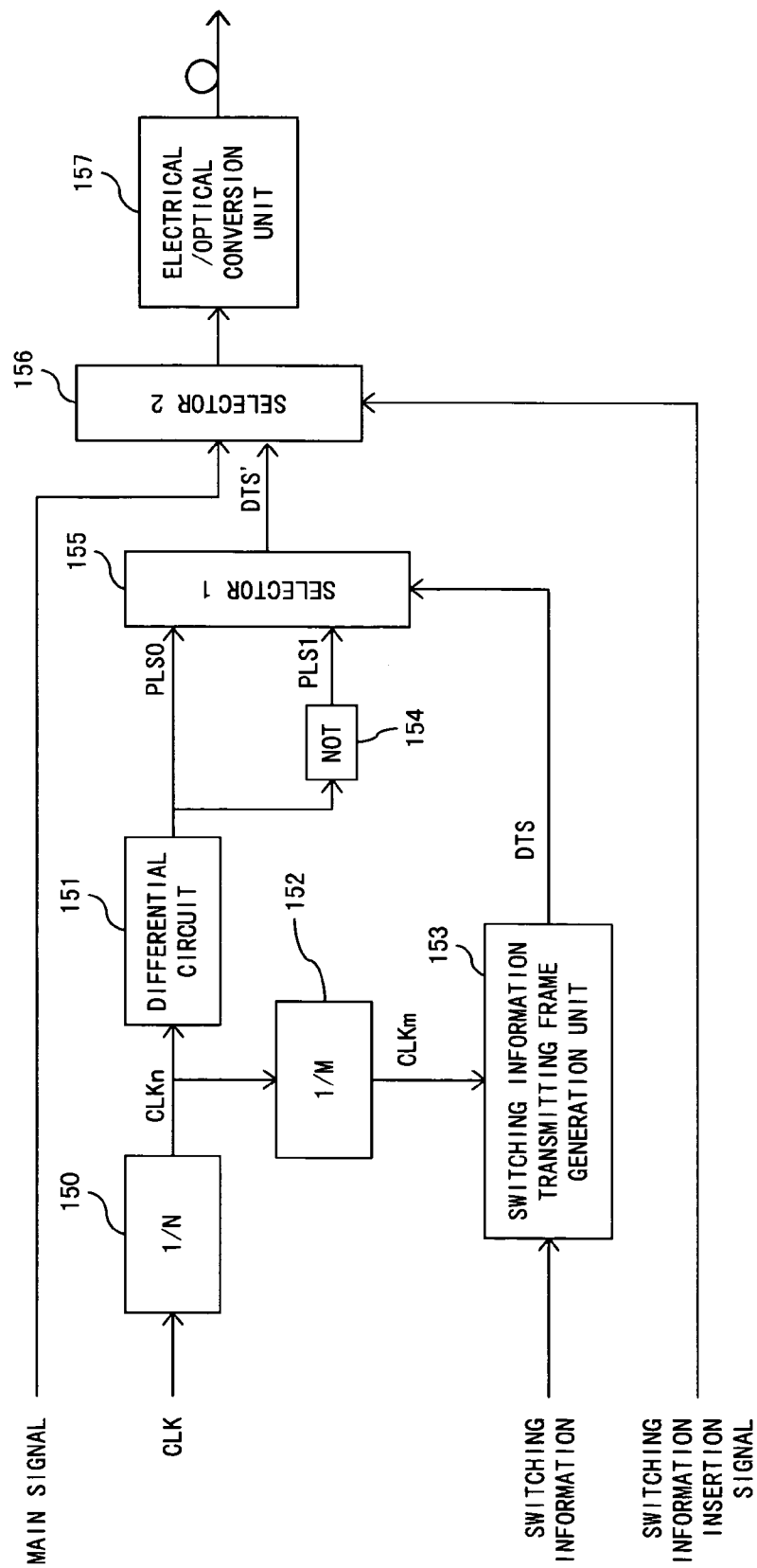
FIG. 12 shows one configuration of the block 121 shown in FIG. 10.

In the present invention, by providing a transmitter with a circuit shown in FIG. 12, the signal string of switching information is prevented from becoming the continuation of "0" or "1" for the purpose of preventing the above problem.

Figure 13:
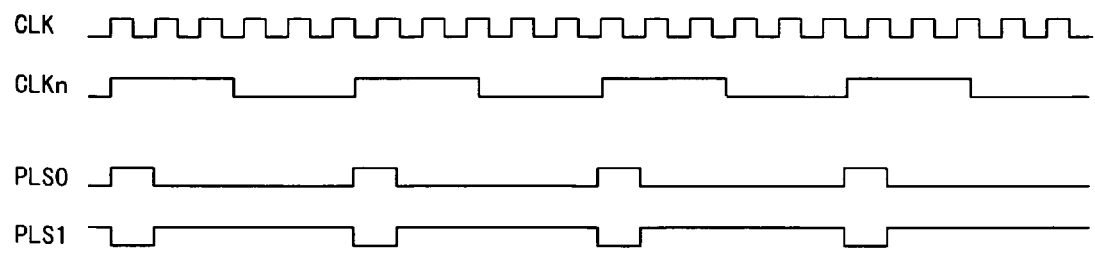
FIG. 13 shows examples of the data or clock of each line in the circuit shown in FIG. 12.
Figure 13:
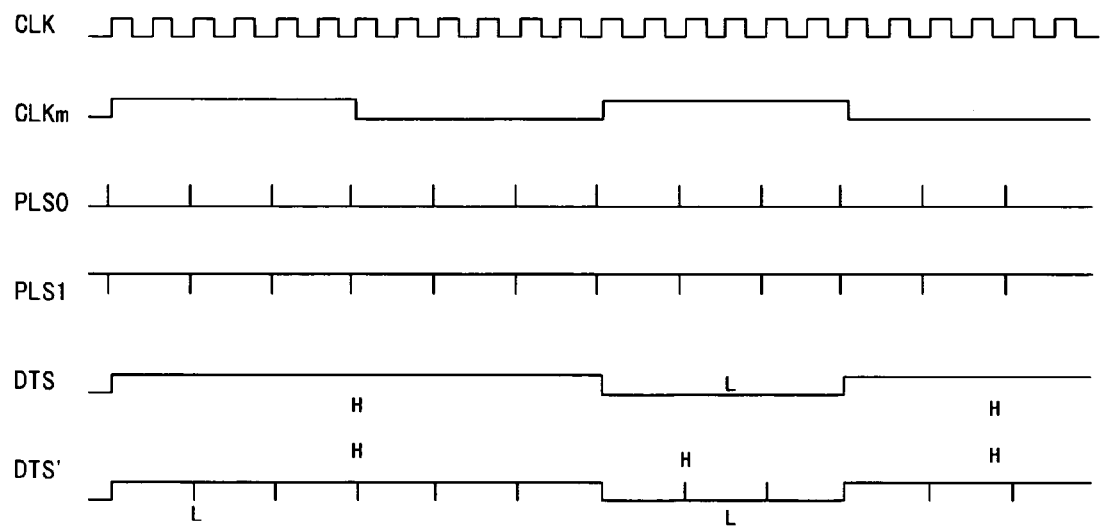

FIG. 12 shows one configuration of the block 121 shown in FIG. 10. FIG. 13 shows examples of the data or clocks of each line in the circuit shown in FIG. 12.

A clock CLK synchronous with a main signal to be used in the transmitter is divided by N (CLKn) by a frequency divider 150 and is branched into two groups. One group is further divided by M (CLKm), and is used to generate a frame (DTS) including switching information in a switching information transmitting frame generation unit 153. The other group of CLKn is converted into a pulse string PLS0 by a differential circuit 151, and a pulse string PLS1 is obtained by inverting this PLS0 by an inversion circuit 154. Then, both PLS0 and PLS1 are inputted to a selector 155. Then, if the DTS is "1", PLS0 is superimposed on the DTS to generate a DTS'. If the DTS is "0", PLS1 is superimposed on the DTS to generate a DTS'.

Lastly, in a selector 156 it is determined whether to transmit usual main signal data or an optical cross-connect switching control signal DTS', according to the instruction of a switching information insertion signal from a higher layer, and is optically outputted by an electrical/optical conversion unit 157.

As shown in FIG. 13, a CLK shown in FIG. 13(a) is a basic clock signal, and CLKn is obtained by dividing the CLK by N. PLS0 and PLS1 are the differential signal of the CLKn and its inverted signal, respectively.

As shown in FIG. 13(b), the frame bits of the DTS are generated according to clock CLKm. Thus, each of PLS0 and PLS1, which are high-speed clocks generated from CLKn, becomes a signal which becomes "1" or "0" at specific intervals. If the bit of the DTS is "H", PLS1 is superimposed on the DTS. If the bit is "L", PLS0 is superimposed on the DTS. Therefore, DTS' on which PLS0 or PLS1 is superimposed, changes from "H" to "L" or from "L" to "H" at specific intervals.

If switching information is transmitted with such a long bit width of several Mbps even when there is no possibility that transmission quality may degrade due to the continuation of "0" or "1", there is a possibility that non-linear optical effects, such as a cross phase modulation (XPM) effect, a four wave mixing (FWM) effect or the like may be generated in wavelength channels not related to switching to degrade transmission quality.

Figure 14:
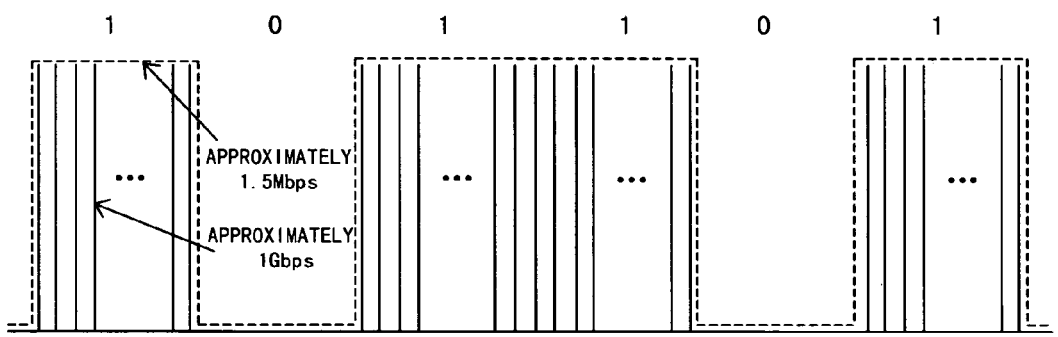
FIG. 14 shows one structure of a signal for suppressing a non-linear effect according to the preferred embodiment of the present invention.

FIG. 14 shows one structure of a signal for suppressing a non-linear effect, according to the preferred embodiment of the present invention.

In this preferred embodiment of the present invention, in order to avoid this, as shown in FIG. 14, each bit of switching information is expressed by a fine consecutive pulse and the bad influence on other wavelengths of the non-linear optical effect is suppressed. Therefore, although the speed of the fine consecutive pulse is approximately 1 Gbps, the speed of a signal expressed by these envelopes becomes approximately 1.5 Mbps. The signal of this around 1.5 Mbps is detected as the switching information.

Figure 15:
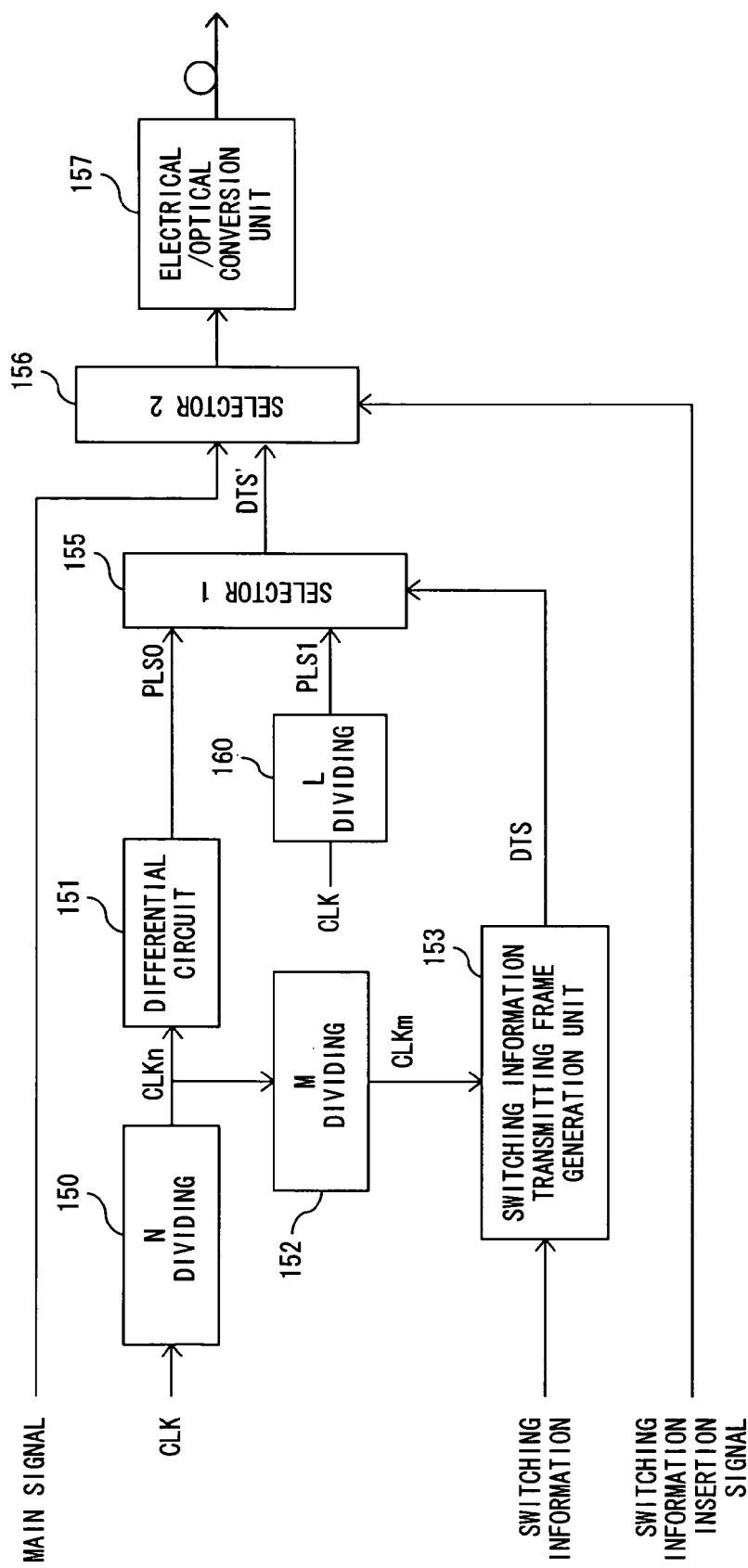
FIG. 15 shows the configuration of a circuit provided for a transmitter, for suppressing the respective influences of the degradation of transmission quality due to the continuation of "1" or "0" and that due to a non-linear optical effect.
Figure 16:
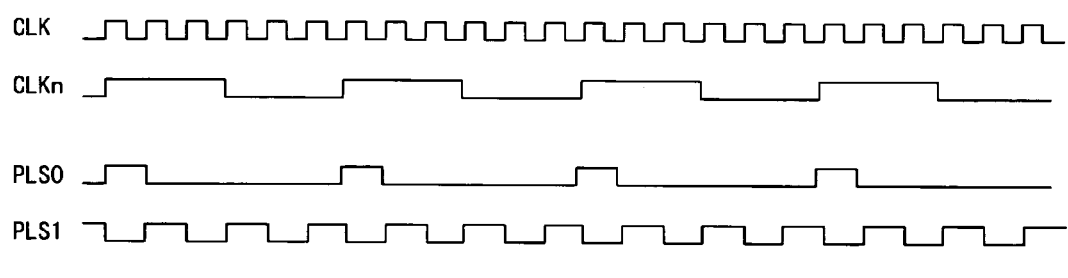
FIG. 16 shows examples of the data or clock of each line in the circuit shown in FIG. 15.
Figure 16:
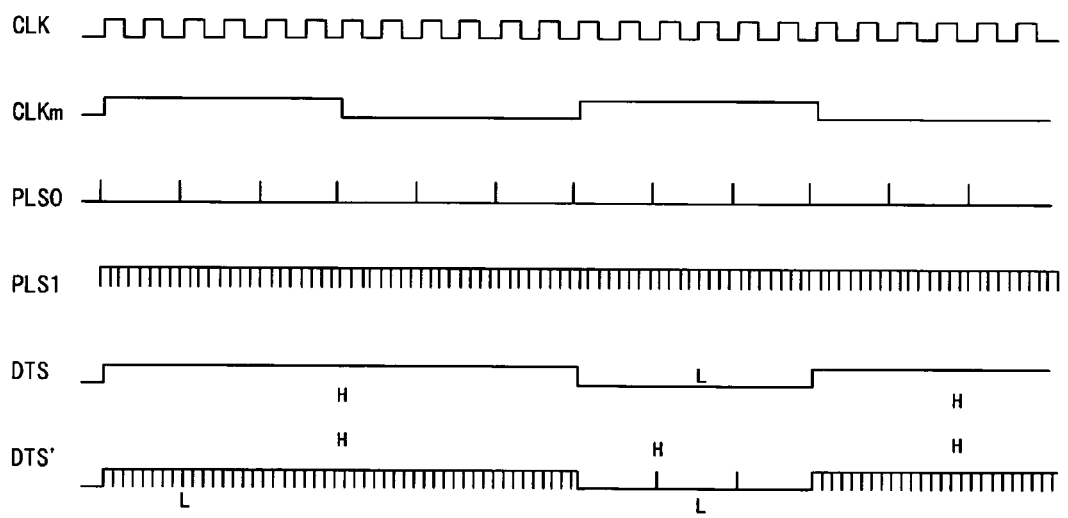

FIG. 15 shows the configuration of a circuit provided for a transmitter, for suppressing the respective influences of the degradation of transmission quality due to the continuation of "1" or "0" and that due to a non-linear optical effect. FIG. 16 shows examples of the data or clock of each line in the circuit shown in FIG. 15.

In FIG. 15, the same reference numerals are attached to the same components as in FIG. 12, and their detailed descriptions are omitted here.

The circuit shown in FIG. 15 superimposes a bit string obtained by dividing the CLK synchronous with a main signal by L using the frequency demultiplexer 160 on a switching signal to generate a DTS' in the selector 155 shown in FIG. 12 only when the switching signal is "1". The number of L is made low such as 2 or 3. In this case, the frequency of PLS1 is higher than that of PLS0. If the DTS is "L" when a PLS is superimposed on the DTS, the DTS' can be made "H" in a fairly low frequency. However, if the DTS is "H", a non-linear effect easily occurs since optical power is transmitted through an optical transmission line. Therefore, an operation for dropping the DTS to "L" is performed more frequently.

Although the data or clock shown in FIG. 16 is basically the same as that shown in FIG. 13, the frequency of PLS1 is higher than that of PLS0. Therefore, a frequency used to invert the data value of a DTS' differs between when the data value is "H" and when it is "L".

FIG. 17 shows one structure of a switching information frame.

In the method of this preferred embodiment, one receiver receives switching information. Therefore, if a plurality of wavelengths simultaneously transmits switching information, such a case cannot be coped with. Such a problem can be solved as follows. By generating switching information in a format shown in FIG. 17, the "error detection/correction" section of the format is detected to be abnormal if a transmitter with a plurality of wavelength channels transmits switching information. Thus, the collision of switch requests is detected and switching is adjusted. Specifically, if one segment of switching information is transmitted in the format shown in FIG. 17, the receiver computes the transmitted data and matches the data with an error detection/correction code. However, if two or more segments of switching information are transmitted, an error occurs in the received signal since the receiver receives two segments of data at a time. An error also occurs in the error detection/correction code. Therefore, the result of computing received data cannot be matched with the error detection/correction code. Thus, by checking the matching of the computation result of received data and an error detection/correction code, it can be determined whether two or more segments of switching information are transmitted. Commands are prepared for a switch request at each of "compulsory", "priority" and "non-priority" levels. An address is composed of a node address and a port address. Furthermore, if a violation code can be detected by generating data using CMI codes or the like, switching information can be extracted more securely, which is effective.

Next, switching sequence in the case where a pair of routes in opposed nodes must be maintained in a matched state, such as in the case of redundant switching made when there is a failure in a specific route or node, is described below.

Figure 18:
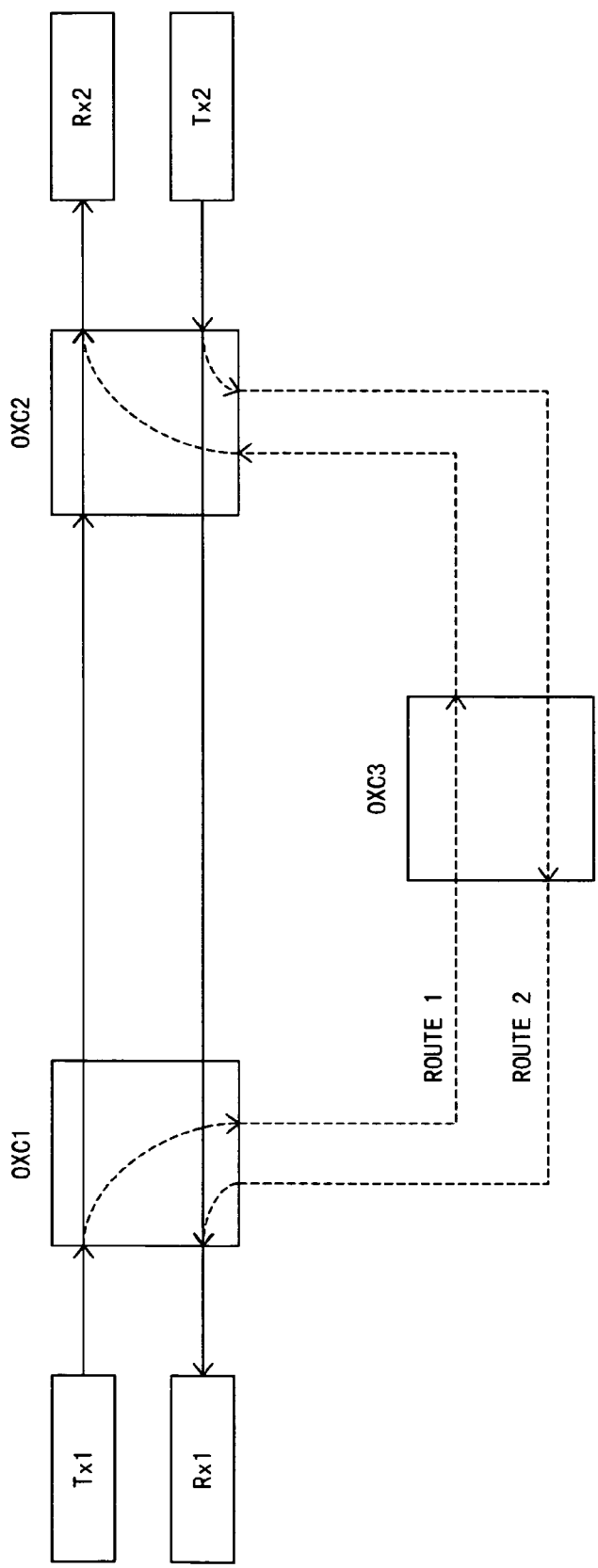
FIG. 18 explains a switching process of matching a pair of routes in opposed nodes.

FIG. 18 explains a switching process of matching a pair of routes in opposed nodes.

The switching procedures of the present invention in such a case, is described with reference to a network configuration shown in FIG. 18.

Specifically, in the initial state, the output of a transmitter Tx1 is transmitted through a route of OXC1→OXC2 and is received by a receiver Rx2, whereas a signal outputted from a transmitter Tx2 for the other pair is transmitted through the same route conversely OXC2→OXC1 and is received by a receiver Rx1. Then, the initial route is redundantly switched to a route of OXC1→OVC2→OXC3.

In such a case, firstly, after the switching of one direction route (route 1 shown in FIG. 18) is performed according to the flow described with reference to FIG. 7 and the completion of the switching is confirmed, the switching of the opposite direction route (route 2 shown in FIG. 18), which is opposed to the one direction route, is started. By taking such a procedure, even when the switching of one direction route is not completed for some reason after the switching is started, a notice can be issued using the opposed opposite direction route that is not switched yet, and it can be determined whether to return to the original route or to switch to the opposite direction route, which is an advantage.

Although in the preferred embodiments, the optical cross-connect has been described as one component, the same description also applies to an optical router as one component.

According to the present invention, the switching of an optical switching station can be freely performed from any station, and accordingly, switching can be performed at low cost.

What is claimed is:

1. A method for performing a switching control of an optical switching device, comprising:

suspending the transmission of a main signal and transmitting control information instructing the switching control of the optical switching device, the control information being transmitted at the wavelength of the main signal;

transmitting a signal for indicating termination of switching information, said signal for indicating termination being transmitted at the wavelength of the main signal and occurring after completing the transmission of the control information; and re-starting the transmission of the main signal suspended when receiving a switching completion notice, wherein said optical switching device is included in a wavelength-division multiplexing system and wavelengths other than the wavelength of a main signal continue to transmit their main signals while a wavelength for switching is transmitting switching information.

2. The method according to claim 1, wherein the signal speed of the switching information is lower than that of a main signal.

3. The method according to claim 2, wherein the switching information is received by a receiving device which collectively receives the wavelength-divisionally multiplexed (WDM) optical signal, does not follow up a main signal and follows up a switching information signal with a signal speed lower than the signal speed of the main signal.

4. The method according to claim 1, wherein the switching completion notice is issued using a fixed pattern signal.

5. The method according to claim 4, wherein the fixed pattern is generated by an optical signal with a low output such that optical devices, such as an optical amplifier and the like, of a communication system including said optical switching device may be prevented from being damaged by an optical surge.

6. The method according to claim 1, wherein in said re-start step, the transmission of a main signal is re-started after receiving the switching completion notice from said optical switching device.

7. The method according to claim 1, wherein the switching information optical signal is switched to "Low" by a pulse with speed higher than signal speed if a signal level is "High", and to "high" if the signal level is "Low".

8. The method according to claim 7, wherein as to the switching of the switching information optical signal, a signal level is more frequently switched from "High" to "Low" than from "Low" to "High".

9. The method according to claim 1, wherein the "High" signal level of the switching information is made of the consecutive transmission of a pulse higher than the signal speed of the switching information.

10. The method according to claim 1, wherein if in a wavelength-division multiplexing system, the switching information is transmitted by a plurality of wavelengths, the collision of the plurality of segments of switching information is detected by checking the matching of received data with an error detection/correction code.

11. The method according to claim 1, wherein when switching a bi-directional optical route, at first, one direction line is switched, and after confirming the completion of the switching of the one direction line, the switching of the opposite direction line is started; and if the switching of the one direction line is not normally completed, the original route is autonomously restored using the opposite direction line that is not switched yet.

12. A control device for performing a switching control of an optical switching device, comprising:

a control information transmitting unit for suspending the transmission of a main signal and transmitting control information instructing the switching control of the optical switching device, the control information being transmitted at the wavelength of the main signal;

a completion notification unit for transmitting a signal for indicating termination of switching information, the signal for indicating termination being transmitted at the wavelength of the main signal and occurring after completing the transmission of the control information; and a re-start unit for re-starting the transmission of the main signal suspended when receiving the switching completion notices, wherein said optical switching device is included in a wavelength-division multiplexing system and wavelengths other than the wavelength of a main signal continue to transmit their main signals while a wavelength for switching is transmitting switching information.

13. The control device according to claim 12 wherein the signal speed of the switching information is lower than that of a main signal.

14. The control device according to claim 13, wherein the switching information is received by a receiving device which collectively receives the wavelength-divisionally multiplexed (WDM) optical signal, does not follow up a main signal and follows up a switching information signal with a signal speed lower than the signal speed of the main signal.

15. The control device according to claim 12, wherein the switching completion notice is issued using a fixed pattern signal.

16. The control device according to claim 15, wherein the fixed pattern is generated by an optical signal with a low output such that optical devices, such as an optical amplifier and the like, of a communication system including said optical switching device may be prevented from being damaged by an optical surge.

17. The control device according to claim 12, wherein the transmission of a main signal is re-started after receiving the switching completion notice from said optical switching device.

18. The control device according to claim 12, wherein the switching information optical signal is switched to "Low" by a pulse with speed higher than signal speed if a signal level is "High", and to "High" if the signal level is "Low".

19. The control device according to claim 18, wherein as to the switching of the switching information optical signal, a signal level is more frequently switched from "High" to "Low" than from "Low" to "High".

20. The control device according to claim 12, wherein the "High" signal level of the switching information is made of the consecutive transmission of a pulse higher than the signal speed of the switching information.

21. The control device according to claim 12, wherein if in a wavelength-division multiplexing system, the switching information is transmitted by a plurality of wavelengths, a collision of the plurality of segments of switching information is detected by checking the matching of received data with an error detection/correction code.

22. The control device according to claim 12, wherein when switching a bi-directional optical route, at first, one direction line is switched, and after confirming the completion of the switching of the one direction line, the switching of the opposite direction line is started; and if the switching of the one direction line is not normally completed, the original route is autonomously restored using the opposite direction line that is not switched yet.

23. An optical switching device, comprising:
an optical switch for switching an optical communication line;
a control information receiving unit for receiving switching information said switching information being transmitted at an identical wavelength as a main signal, wherein the main signal of the wavelength by which the signal switching information is transmitted is stopped while the switching information is transmitted;
a switching control unit for instructing the optical switch to switch the optical communication line, according to the control information after receiving a switching information end signal; and
a completion notification unit for notifying the transmitting source of the switching information of the completion of the switching;
said optical switching device being included in a wavelength-division multiplexing system and receiving a wavelength-division multiplexing optical signal that continues to transmit a main signal while wavelengths other than the wavelength of a main signal are transmitting switching information.

24. The optical switching device according to claim 23, wherein the signal speed of the switching information is lower than that of a main signal.

25. The optical switching device according to claim 24, wherein the switching information is received by a receiving device which collectively receives the wavelength-division multiplexed optical signal, does not follow up a main signal and follows up a switching information signal with a signal speed lower than the signal speed of the main signal.

26. The optical switching device according to claim 23, wherein the switching completion notice is issued using a fixed pattern signal.

27. The optical switching device according to claim 26, wherein the fixed pattern is generated by an optical signal with a low output such that optical devices, such as an optical amplifier and the like, of a communication system including said optical switching device may be prevented from being damaged by an optical surge.

28. The optical switching device according to claim 23, wherein the transmission of a main signal is re-started after receiving the switching completion notice from said optical switching device.

29. The optical switching device according to claim 23, wherein the switching information optical signal is switched to "Low" by a pulse with speed higher than signal speed if a signal level is "High", and to "High" if the signal level is "Low".

30. The optical switching device according to claim 29, wherein as to the switching of the switching information optical signal, a signal level is more frequently switched from "High" to "Low" than from "Low" to "High".

31. The optical switching device according to claim 23, wherein the "High" signal level of the switching information is made of the consecutive transmission of a pulse higher than the signal speed of the switching information.

32. The optical switching device according to claim 23, wherein if in a wavelength-division multiplexing system, the switching information is transmitted by a plurality of wavelengths, a collision of the plurality of segments of switching information is detected by checking the matching of received data with an error detection/correction code.

33. The optical switching device according to claim 23, wherein when switching a bi-directional optical to ate, at first, one direction line is switched, and after confirming the completion of the switching of the one direction line, the switching of the opposite direction line is started; and if the switching of the one direction line is not normally completed, the original route is autonomously restored using the opposite direction line that is not switched yet.

* * * * *